Figure 1:
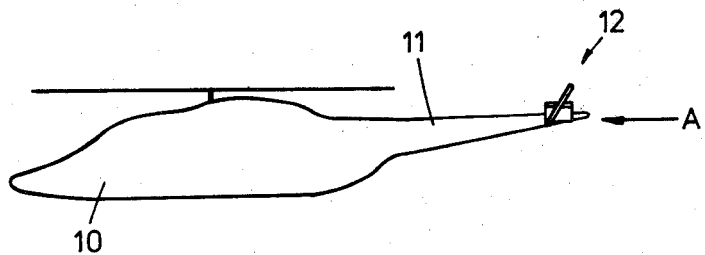

United States Patent [19]

Byham et al.

[11] 4,347,997

[45] Sep. 7, 1982

[54] HELICOPTERS

[75] Inventors: Geoffrey M. Byham, Yeovil; Ronald V. Smith, Sherborne, both of England

[73] Assignee: Westland Aircraft Limited, Yeovil, England

[21] Appl. No.: 133,095

[22] Filed: Mar. 24, 1980

[30] Foreign Application Priority Data

Mar. 23, 1979 [GB] United Kingdom ................ 7910385

[51] Int. Cl.³ ............................................ B64C 27/82
[52] U.S. Cl. .............................. 244/17.19; 244/17.21; 244/17.13; 416/123; 416/130
[58] Field of Search ............. 244/17.19, 17.21, 17.11, 244/17.13, 8; 416/123, 122 R, 130, 26, 25, 120

[56] References Cited

U.S. PATENT DOCUMENTS

| 1,635,897 | 7/1927 | Nelson | 244/17.19 |
| 1,964,179 | 6/1934 | Roth et al. | 244/17.19 |
| 2,130,918 | 9/1938 | De Stefano | 244/17.19 |
| 2,225,002 | 12/1940 | Focke | 244/225 |
| 2,420,784 | 5/1947 | Larson | 244/17.19 |
| 2,699,833 | 1/1955 | Jensen | 244/17.21 |
| 2,702,084 | 2/1955 | Focke | 416/123 |
| 2,733,878 | 2/1956 | Ciscel | 244/17.13 |
| 3,426,982 | 2/1969 | Markwood | 244/17.19 |
| 3,540,680 | 11/1970 | Peterson | 244/17.19 |

FOREIGN PATENT DOCUMENTS 125005 10/1945 Canada ........................... 244/17.19

Primary Examiner—Galen L. Barefoot
Assistant Examiner—C. T. Bartz
Attorney, Agent, or Firm—Larson and Taylor

[57] ABSTRACT

A helicopter including a power absorber arranged to selectively absorb power from a sustaining rotor system during deceleration. In an illustrated embodiment for a helicopter having a single sustaining rotor, the power absorber comprises a tail rotor assembly having two tail rotors located one on each side of a tail cone, and a control operative to adjust the pitch setting of the tail rotors to provide lateral thrust forces in opposed directions with a net lateral thrust force in one direction in order to maintain a desired heading during deceleration.

10 Claims, 7 Drawing Figures

HELICOPTERS

DESCRIPTION OF INVENTION

This invention relates to helicopters.

High forward speeds attainable by modern helicopters have resulted in corresponding increases in the required stopping distances, especially in respect of straight line stops from high speed level flight.

The procedure in such a manoeuvre is for the pilot to reduce power and operate the cyclic control to rotate the helicopter into a nose-up attitude. The forward velocity of the helicopter creates a reverse air flow through the rotor(s) of the sustaining rotor system which tends to increase the rotational speed of the rotor and this is usually controlled by a rotor speed governing system acting automatically to reduce the engine power output to the rotor to maintain a constant rotor speed. As the nose-up attitude is further increased the engine power output continues to be decreased until, ultimately, the engine power being supplied to the rotor system approaches zero. This sets a limit on the attainable nose-up attitude since a further increase would increase the reverse airflow causing an increase in rotor speed beyond an acceptable limit.

Thus, helicopter straight-line deceleration from high speed forward flight is limited by the nose-up attitude to which the helicopter can be rotated. In the case of a helicopter having a single main sustaining rotor and an anti-torque auxiliary rotor, e.g. a tail rotor, the limitation on nose-up attitude occurs when the main rotor tends to overspeed as a result of "autorotation" of the rotor by the reverse mass airflow. High nose-up attitudes can be attained only at low forward speeds and do not significantly reduce an overall stopping distance. At high forward speeds the fuselage parasitic drag may allow adequate initial deceleration but this becomes progressively less effective as the helicopter slows down.

Accordingly, in one aspect, the invention provides a helicopter characterised by power absorber means arranged to selectively absorb power from a sustaining rotor system during deceleration.

The power absorber means may comprise at least one pair of auxiliary rotors, and the helicopter may have a control system arranged during normal operation to adjust the pitch setting of each pair of auxiliary rotors to provide thrust forces in the same direction and, during deceleration, to adjust the pitch setting of each pair of auxiliary rotors to provide thrust forces in generally opposed directions.

Although the invention is applicable to helicopters of other configurations, e.g. those with main sustaining rotor systems comprising two or more rotors, such as tandem and co-axial rotor systems, it is especially advantageous in helicopters having a single main sustaining rotor and an anti-torque auxiliary rotor, e.g., a tail rotor. In applying the invention to a helicopter of this configuration, a pair of auxiliary rotors may be located adjacent the end of a rearwardly extending tail cone. Conveniently, the auxiliary rotors are supported laterally one on each side of the tail cone and are arranged so that said thrust forces comprise lateral thrust forces in a yaw direction so as to operate as an anti-torque tail rotor during normal operation. The direction of the opposed thrust forces may be generally inwardly from each auxiliary rotor.

The helicopter may include a differential pitch adjusting mechanism activated automatically at the onset of zero torque to the single main sustaining rotor by electrical signals from a rotor speed governor and a yaw/heading control mechanism to adjust the pitch setting of the auxiliary rotors differentially to provide a net lateral thrust force in a desired yaw direction in order to maintain the helicopter on a desired heading.

The yaw/heading control mechanism may be controlled by rudder pedals incorporating a gearing mechanism operative to vary the yaw demand dependant on the actual collective pitch setting of the tail rotors, the gearing being phased-in automatically by an electrical signal generated by the yaw/heading control mechanism in response to a reference signal from the differential pitch adjusting mechanism.

Preferably, a manual inhibition system is arranged to selectively isolate the differential pitch adjusting mechanism so as to prevent differential pitch being applied during certain phases of operation.

In another aspect the invention provides a helicopter having a fuselage including a rearwardly extending tail cone, a main sustaining rotor located above the fuselage for rotation about a generally vertical axis, a tail rotor assembly located adjacent a rear end of the tail cone and comprising two tail rotors supported laterally one on each side of the tail cone, and a control system arranged during deceleration of the helicopter to adjust the pitch setting of both tail rotors so that the tail rotors provide respective lateral thrust forces in generally opposed directions.

Preferably, the control system includes a differential pitch adjusting mechanism arranged to control the pitch setting of the two tail rotors differentially to provide unequal lateral thrust forces in the generally opposed directions resulting in a variable net lateral thrust in one desired lateral direction.

As previously explained, during deceleration a helicopter having a single main sustaining rotor operates in an autorotative condition in which the rotor is rotated by reverse airflow through the main rotor disc. Autorotation is, of course, also used in helicopter operation to enable a helicopter to land safely in the event of a power failure, however, it is the autorotative condition existing during the deceleration mode of operation with which this invention is particularly concerned.

Figure 2:
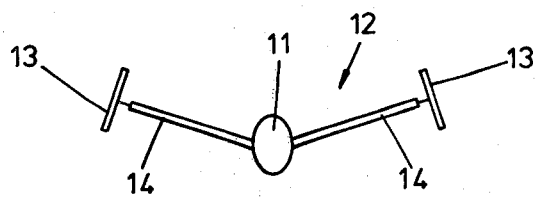
Figure 3:
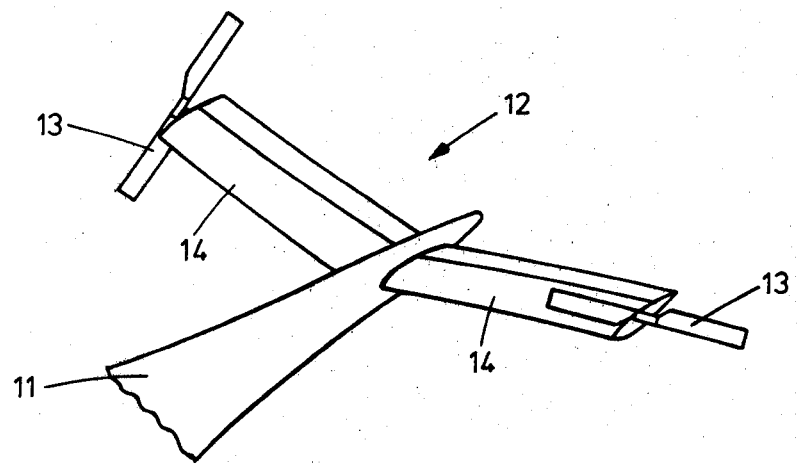
Figure 4:
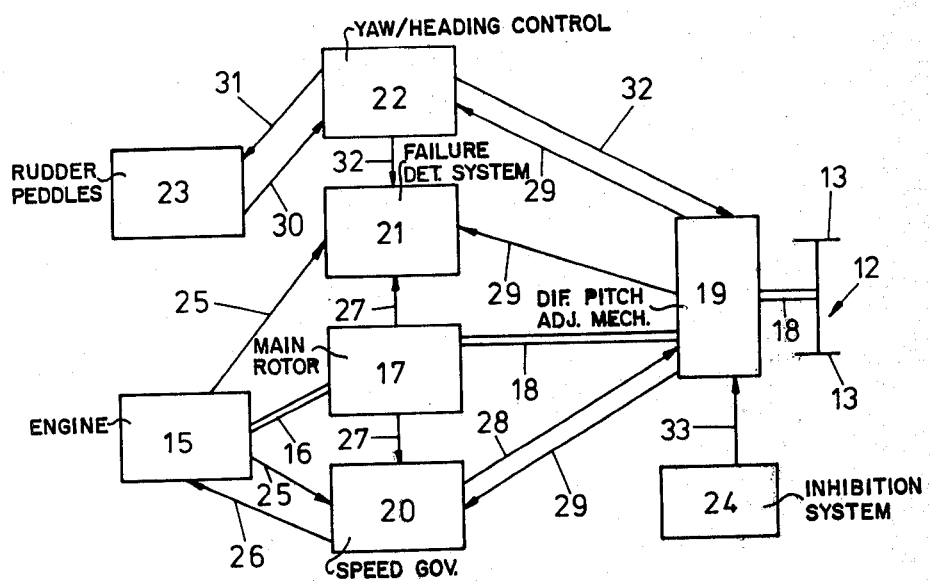
Figure 5:
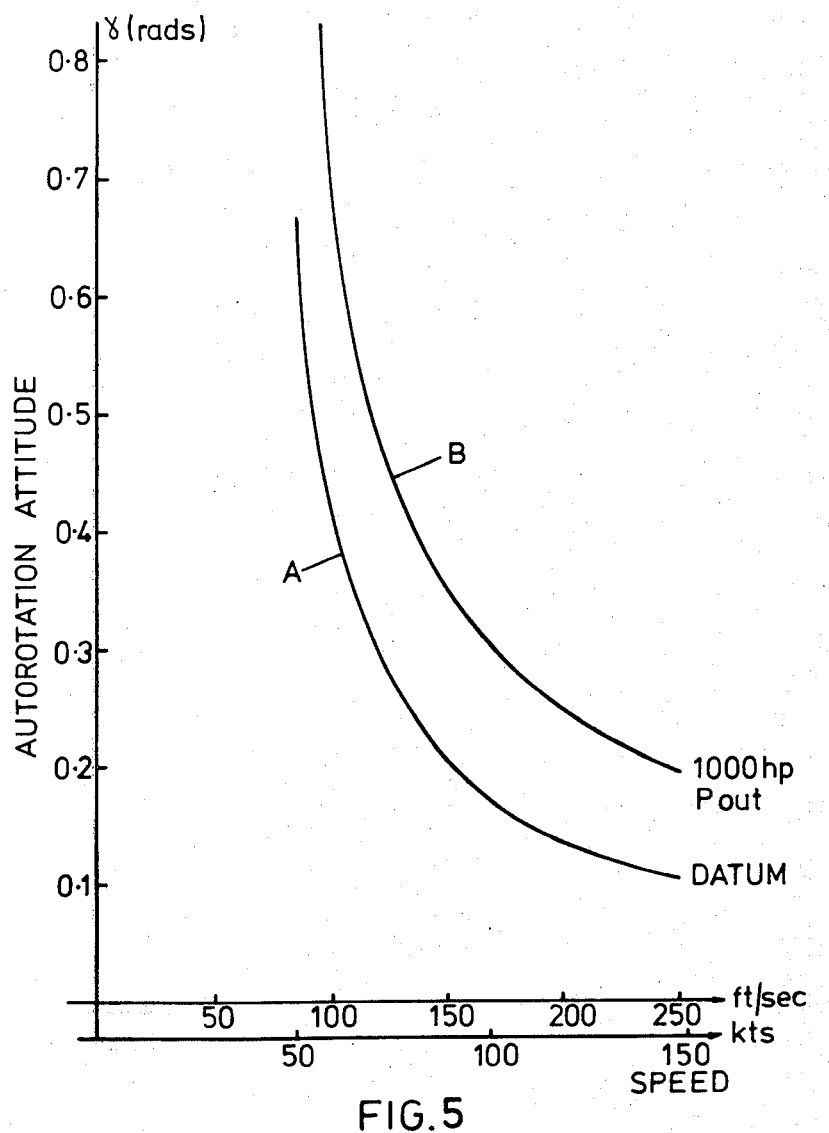
Figure 6:
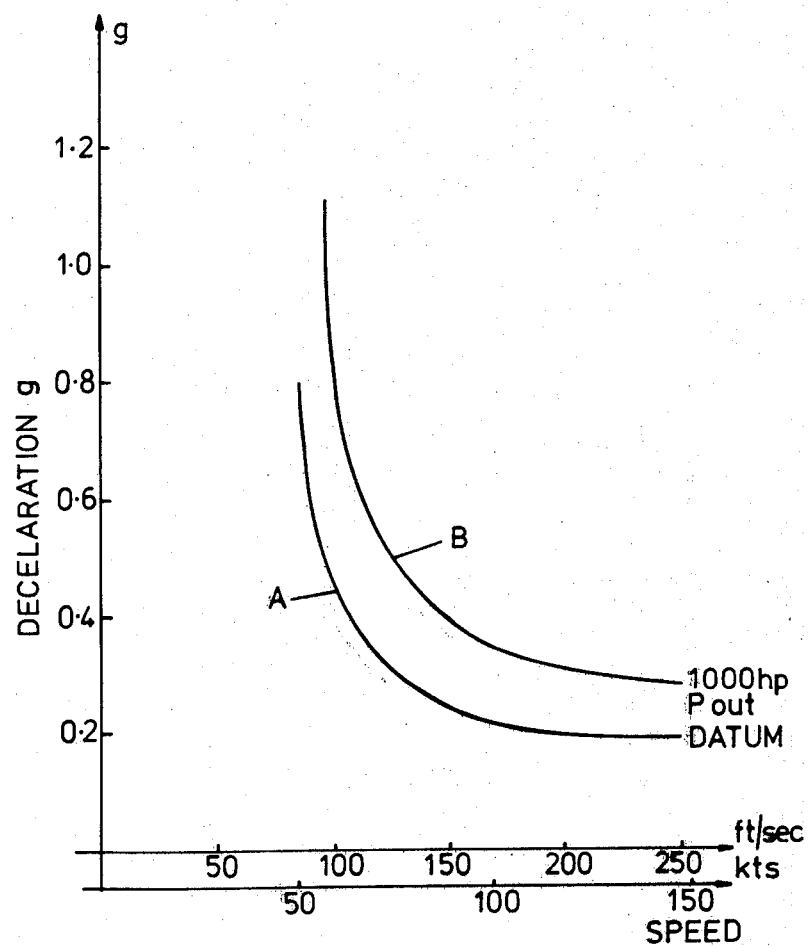
Figure 7:
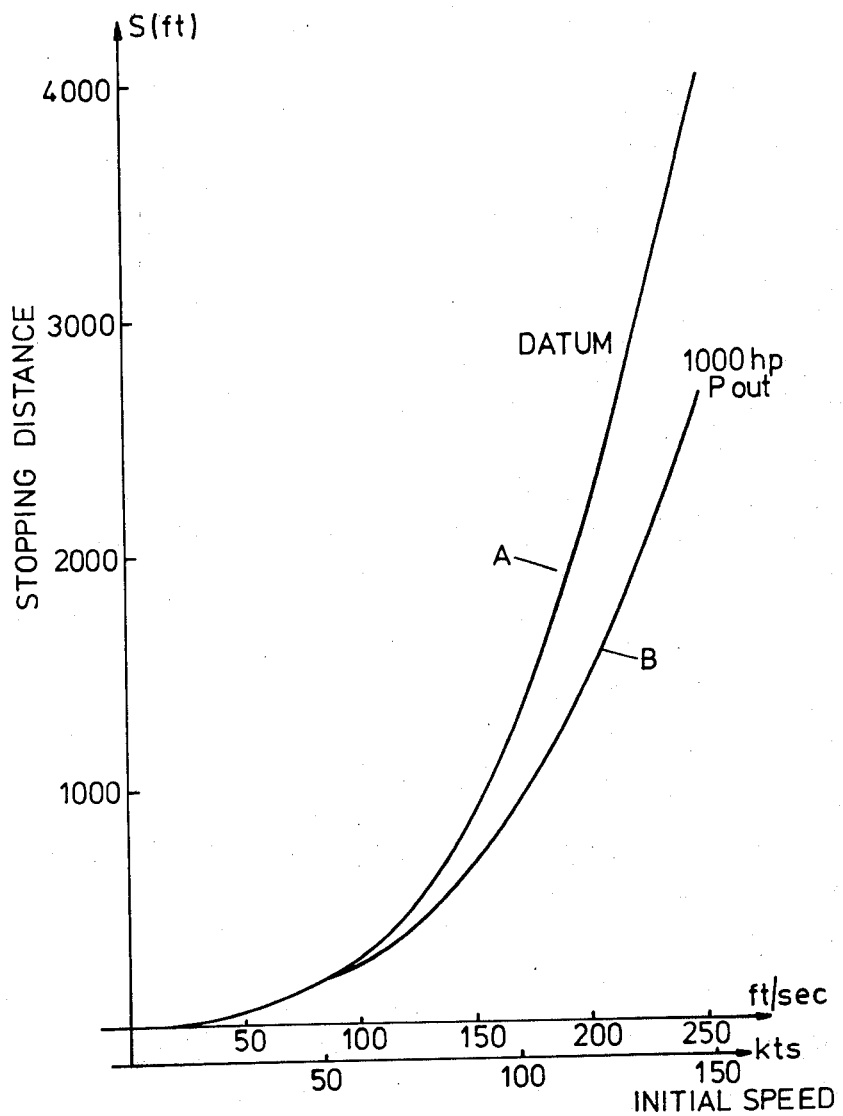

The invention will now be described by way of example only and with reference to the accompanying drawings, in which:

FIG. 1 is a side elevation of a helicopter constructed in accordance with one embodiment of the invention, FIG. 2 is a view taken in the direction of arrow A of FIG. 1, FIG. 3 is a fragmentary perspective illustration of the tail rotor assembly of the helicopter of FIGS. 1 and 2, FIG. 4 is a diagram of a control system according to the invention for controlling the tail rotor assembly, and, FIGS. 5 to 7 inclusive are graphs based on calculated values of various parameters providing a comparison in respect of a helicopter with and without the features of this invention.

In considering the problem of improving the deceleration characteristics of a high speed helicopter having a single main sustaining rotor, the inventors recognised that it would be necessary to increase the attainable nose-up attitude without a corresponding increase in the rotor rotational speed. In this "autorotative" condition, power to maintain rotation of the main rotor is provided by reverse airflow through the rotor disc, and an accessory gearbox is normally driven by the main rotor to maintain control of the helicopter. The inventors realised that, if the main rotor could be made to do more work in this condition, then more power could be absorbed by the main rotor before rotor overspeed occurred, and that a greater reverse mass airflow could be tolerated thereby increasing the attainable nose-up attitude and, consequently, the deceleration force being applied by the main rotor.

In normal flight, torque applied to a main rotor of a helicopter by a power source creates a turning moment tending to rotate a fuselage about the main rotor rotational axis, and this is reacted by a generally lateral thrust force from a tail rotor.

In the autorotative condition the main rotor is driven by reverse airflow and, in turn, provides the power to drive an accessory gearbox. This results in a relatively small turning moment on the fuselage which is reacted by a small residual lateral thrust from the tail rotor.

Since the deceleration manoeuvre takes the helicopter into an autorotative condition the tail rotor is normally feathered during the manoeuvre so as to provide only the small residual lateral thrust required to compensate for the torque reaction produced by the main rotor.

At this time, the inventors were also involved in an appraisal of various tail rotor configurations with the aim of improving normal yaw control of a helicopter, and to provide continued control in the event of tail rotor loss, and one of the schemes under consideration was a twin tail rotor configuration consisting of two tail rotors mounted on fins or outriggers laterally of the tail cone. However, the inventors realised that potential in utilising the twin tail rotor concept as the means of absorbing power from the main rotor during the autorotative condition experienced in the deceleration manoeuvre, by arguing that if the two tail rotors could be arranged to provide high thrust in opposite directions whilst retaining the required small net lateral thrust, then this should extract a significant amount of extra power from the main rotor and allow a higher nose-up attitude to be attained before rotor overspeed occurred.

Subsequent calculations indicated that, for a particular helicopter having a single main sustaining rotor, the incorporation of a twin tail rotor having the facility to provide opposed thrust could reduce the stopping distance of that helicopter by as much as one third. This represents a useful benefit in respect of the required stopping distance, and is a very attractive solution since it can be combined in a single mechanism which provides other advantages such as the improved yaw control and tail rotor loss capability of the twin tail rotor configuration.

Referring now to FIGS. 1 to 3 inclusive, a helicopter has a fuselage 10 including a rearwardly extending tail cone 11. A single main sustaining rotor 17 is mounted above the fuselage 10 and a tail rotor assembly, generally indicated at 12, is located adjacent a rear end of the tail cone 11. The tail rotor assembly 12 comprises two tail rotors 13 located respectively at the ends of laterally extending fins 14 and in the illustrated embodiment, the fins 14 extend upwardly and outwardly from the tail cone 11 at an angle of approximately 20 degrees. Each tail rotor 13 is mounted for rotation in a plane perpendicular to its respective fin 14.

One or more engines and a transmission system (not shown) are provided and arranged to drive the main sustaining rotor 17 and the two tail rotors 13 through suitable drive shafts and gearing.

The blades of each tail rotor 13 are adjustable collectively in pitch to provide a lateral thrust in either direction perpendicular to their plane of rotation, and the helicopter includes a control system for adjusting the pitch of each of the individual tail rotors 13 to provide either lateral thrust forces in the same direction, or varying degrees of lateral thrust forces in opposite directions.

A control system for controlling uniform adjustment of the tail rotors 13, i.e. during normal flight in which the tail rotors 13 are employed conventionally to provide yaw control, does not form part of this invention and is therefore not described in detail in the following description. However, it will be understood that certain features of the control system now to be described with reference to the present invention will also have a functional requirement during conventional control manoeuvres. Such equipment includes a rotor speed governor, a yaw/heading control mechanism and rudder pedals.

Referring now to FIG. 4, one or more engines 15 are arranged to supply the required torque through drive shafts and gearing 16 to drive the main rotor 17, and through further shafts and gearing 18 and a tail rotor differential pitch adjusting mechanism 19 to drive the tail rotor assembly 12.

Electrical signals 25 representative of the actual torque being applied to the main rotor 17 are transmitted to a rotor speed governor 20 and a failure detection system 21, and a signal 26 generated by the rotor speed governor 20 and representative of a torque demand is transmitted to the engine 15. The rotor speed governor 20 and failure detection system 21 also receive signals 27 representative of the rotational speed of the main rotor 17.

During a certain phase of operation to be hereinafter described, the rotor speed governor 20 generates a demand signal 28, and this is transmitted to the tail rotor differential pitch adjusting mechanism 19 which adjusts the pitch setting of the two tail rotors 13 to provide lateral thurst forces in opposed directions. Signals 29 representative of the applied pitch setting are transmitted from the mechanism 19 to the rotor speed governor 20, the failure detection system 21 and to a yaw/heading control mechanism 22.

The yaw/heading control mechanism 22 receives yaw demand signals 30 from pilot rudder pedals 23, and generates a signal 31 based on the applied pitch setting of the tail rotor assembly 12 to suitably adjust a gearing associated with the rudder pedals 23. A signal 32 representative of a yaw rate and acceleration is generated by the yaw heading control system 22 and is transmitted to the failure detection system 21 and to the differential pitch adjusting mechanism 19.

A manually operable inhibition system 24 is provided and is connected electrically to the tail rotor differential pitch mechanism 19 for a purpose to be hereinafter described.

When it is required to stop the described helicopter as quickly as possible from high speed forward flight, the pilot reduces power being supplied by engine 15 and operates a main rotor cyclic pitch control to rotate the helicopter into a nose-up attitude. This tends to increase the rotational speed of the main rotor 17 due to reverse airflow through the rotor disc and this is sensed by the rotor speed governor 20 which acts to further reduce the power output of the engine 15 until the torque being supplied to the main rotor 17 approaches zero. This phase of the deceleration manoeuvre is conventional and, as previously explained, in helicopters having single sustaining and anti-torque rotors and conventional control system, the position at which zero torque is being applied to the main rotor 17 from engine 15 limits the attainable nose-up attitude and therefore the deceleration force which can be applied to the helicopter. This, in turn, dictates the required stopping distance of the particular helicopter from high speed forward flight.

It will be understood that the helicopter is now in an autorotative condition in which the main rotor is being driven by reverse airflow through the rotor disc due to the forward velocity of the helicopter, and the tail rotor assembly 12 is being driven from the main rotor 17.

However, in the described helicopter embodying the invention, the onset of zero torque to the main rotor 17 is sensed by the rotor speed governor 20 which generates electrical signal 28. This signal is transmitted to the tail rotor differential pitch adjusting mechanism 19 which adjusts the collective pitch setting of the individual tail rotors 13 to provide lateral thrust forces in opposite directions generally inwardly from each of the tail rotors 13. Yaw demand signal 32 is fed to the mechanism 19 and results in a desired differential being applied to the respective pitch settings of the tail rotors 13 so that a small net lateral thrust in a desired yaw direction is maintained in order to compensate for the aforementioned main rotor torque reaction, and maintain the helicopter on a desired heading. Thus, the arrangement of the present invention, which permits this small net lateral thrust to be achieved with a relatively high collective pitch angle setting of each of the individual tail rotors 13, means that the tail rotor assembly 12 absorbs considerable power from the main rotor 17 while the helicopter is in the autorotative condition during the deceleration manoeuvre.

This, in turn, tends to reduce the rotational speed of the main rotor, and this is retained at a desired level by an increase in the nose-up attitude thereby increasing the reverse mass airflow through the rotor disc.

The pitch setting of the tail rotors 13 is progressively increased differentially to a pre-selected maximum at which the tail rotor assembly 12 absorbs high power from the main rotor 17 whilst maintaining the necessary yaw control thereby establishing the maximum attainable nose-up attitude of the helicopter and, correspondingly, the maximum deceleration force.

To terminate the manoeuvre, as the forward speed of the helicopter decreases, the pilot reduces the cyclic pitch setting of the main rotor to restrict the nose-up attitude. A resultant tendency for the rotational speed of the main rotor 17 to decrease is sensed by the rotor speed governor 20 which automatically adjusts the signal 28 to the tail rotor differential pitch adjusting mechanism 19 to reduce the pitch setting of the tail rotors 13. At the same time, a signal 29 representative of the actual torque being applied to the tail rotors 13 is transmitted to the rotor speed governor 20 and, when this reduces to zero, the governor 20 transmits a demand signal 26 to the engine 15 to increase the torque to the main rotor 17 to maintain the rotational speed of the main rotor 17 at the level required to ensure that the helicopter remains airborne and controllable in a hovering condition at the end of its deceleration mode, i.e., in a normal flight mode.

The yaw/heading control mechanism 22 ensures that the helicopter remains controllable and steerable during the deceleration mode. It is known that, as a tail rotor approaches its maximum thrust, increases in pitch are less effective in generating thrust for yaw control. In the arrangement of the present invention in which, as previously explained, the two tail rotors 13 are used during deceleration to provide lateral thrust in opposite directions, as the maximum pitch limit is approached, yaw control is achieved by moving one of the tail rotors 13 away from a stalled condition to provide a net lateral thrust to control the helicopter in yaw, i.e., once full pitch is applied to the two tail rotors 13, yaw demands, applied through signal 32, operate on one only of the tail rotors 13 at a time. The mechanism 22 includes logic circuitry to determine which of the two rotors 13 is adjusted depending on the yaw demand initiated by the pilot at the rudder pedals 23.

Due to the reduced thrust gradient close to the maximum thrust of the tail rotors 13, gearing is associated with the rudder pedals 23 to automatically compensate for the actual pitch setting of the two tail rotors 13. The gearing has a ratio of at least 4:1 and is phased-in automatically by signal 31 from the yaw/heading control mechanism 22 which, in turn, is initiated by a reference signal from the tail rotor differential pitch adjusting mechanism 19.

In normal flight, loss of one of the two tail rotors 13 can be survived due to the high thrust capability of the individual tail rotors 13. However, if such a loss occurs during the deceleration mode hereinbefore described, a large yaw input may occur accompanied by a tendency for the main rotor 17 to overspeed. In such an event, the failure detection system 21 operates to initiate remedial action to ensure the safety of the helicopter. The system 21 monitors engine torque and main rotor r.p.m. and receives input signals 32 and 29 representative of yaw rate and acceleration and an actual pitch setting of the tail rotor assembly 12.

The manual inhibition system 24 serves to isolate the tail rotor differential pitch adjusting mechanism 19 through signal 33 and is used during normal autorotative descents, i.e. in the event of a complete power failure to prevent opposed thrust forces being applied by the tail rotors 13 due to the reduction of the torque being applied to the main rotor 17 to zero. This is a necessary safety factor, since, in an autorotative descent, all the available power created by reverse airflow rotating the main rotor 17 as the helicopter descends is required to control the rate of descent and ensure that the inertia in the rotor 17 is sufficient to arrest the rate of descent as the helicopter approaches the ground in order to effect a safe landing.

The effects of the automatic power absorption of the twin tail rotor assembly 12 of this invention are illustrated in FIGS. 5 to 7 inclusive which are derived from calculations based on a single main rotor helicopter of about 25,000 pounds all-up-weight, and assuming that the power absorbed ($P_{out}$) by the two tail rotors 13 is constant at 1,000 H.P. Each of the graphs include two curves based on a similar helicopter, datum curve A representing results based on the helicopter with a conventional single tail rotor and control system, and curve B representing results based on a helicopter constructed in accordance with the described embodiment of the invention.

FIG. 5 plots the attainable autorotative attitude (γ radians) against forward level flight speed. It will be noted that the attainable attitude increases rapidly at speeds below about 120 ft./sec. and this is due to the inability of the rotor inflow component to overcome the power losses of the rotor while maintaining the helicopter in level flight. The significant feature as far as the present invention is concerned is the appreciable increase in autorotative attitudes attainable above this speed.

FIG. 6 plots deceleration (g) against forward speed and includes a fuselage parasitic drag term. Again the significant feature is the increase in deceleration indicated by curve B attainable by the helicopter of this invention.

FIG. 7 presents the stopping distances for the two helicopters being considered and is derived from FIG. 6. A stopping distance (ft.) is plotted against forward speed, and it is assumed that once the helicopter has been rotated nose-up so that the attitude of the rotor disc reaches 30 degrees, power is resumed to the main rotor to maintain this attitude. It will be seen that at low forward flight speed, the incorporation of the invention has little effect on the total stopping distance and this is due to the fact that higher nose-up attitudes are conventionally attainable at low forward speeds as previously explained. However, if we consider the case at a high forward speed of 250 ft./sec. it will be seen that the helicopter without the invention (curve A) requires a stopping distance of about 4,020 ft., whereas the helicopter incorporating the invention (curve B) requires a stopping distance of about 2,688 ft., i.e. a reduction in stopping distance of about 33 percent. This is achieved according to this invention by absorbing power from the main rotor 17 during the deceleration manoeuvre. The use of a twin tail rotor as the power absorber provides the added advantages of improved yaw response during normal flight and improved tail rotor loss survivability.

However, whilst the invention has been particularly described and illustrated in respect of a helicopter having a single main sustaining rotor and an anti-torque tail rotor, it is to be understood that the incorporation of a selectively operable power absorber means to absorb power from a sustaining rotor system as taught by this invention will reduce the stopping distance of other configurations such as helicopters having tandem or co-axial sustaining rotors, by permitting a higher nose-up attitude to be attained during deceleration. Since anti-torque rotors are not normally required in such configurations, one or more pairs of rotors constituting a power absorber means as in the described embodiment may be utilised as auxiliary rotors, and may be arranged to provide other functions such as lift, control or propulsion during normal operation whilst maintaining the facility during deceleration to provide thrust forces in generally opposed directions thereby combining high power absorption with no net thrust input.

The power absorption characteristics of the two rotors 13 of the described embodiment can be enhanced by detail design features of the rotor blades employed. Thus, an increased blade chord dimension would increase both rotor thrust and profile drag providing increased power absorption. Aerofoil sections can be employed which feature a rapid drag rise above a particular incidence or Mach number, and the rotors could be driven into a high drag regime when power absorption is required. A reduction in the rotor disc area would increase the power required to produce a given thrust and would result in a more compact configuration, and rotor blade twist could be selected to promote early tip stall or the progressive spread of stall to provide readily controllable power absorption characteristics.

Whilst one embodiment has been described and illustrated, it will be understood that various modifications can be made without departing from the scope of the invention as defined in the appended claims. Other power absorber means could be used to absorb power from the sustaining rotor, and in a twin tail rotor configuration, boundary layer control of the tail rotor blades could be used to achieve the opposing thrust forces. The gearing associated with the yaw demand mechanism may be operated either mechanically or electrically.

We claim as our invention:

1. An improved helicopter having increased deceleration comprising:
    a main sustaining rotor system;
    a pair of auxiliary rotors drivingly coupled to the sustaining rotor system and having adjustable pitch settings, said auxiliary rotors arranged to produce thrusts for control purposes; and
    a control means for adjusting the pitch settings of said auxiliary rotors to provide additive control thrust forces when driving torque is applied to said sustaining rotor system and to provide opposed thrust forces for absorbing power from said sustaining rotor system during deceleration of the helicopter thereby increasing the deceleration effect on the helicopter.

2. A helicopter as claimed in claim 1, where said main sustaining rotor system is a single main rotor and wherein said pair of auxiliary rotors are located adjacent the end of a rearwardly extending tail cone.

3. A helicopter as claimed in claim 2, wherein said pair of auxiliary rotors are supported laterally one on each side of said tail cone and arranged so that said control thrust forces comprise lateral thrust forces in a yaw direction.

4. A helicopter as claimed in claim 3, wherein the direction of the opposed thrust forces operative during deceleration is generally inwardly from each auxiliary rotor.

5. A helicopter as claimed in claim 3 including an auxiliary rotor differential pitch adjusting mechanism which is activated at the onset of zero torque to the sustaining rotor by electrical signals from a rotor speed governor and a yaw/heading control mechanism to adjust the pitch setting of the auxiliary rotors differentially to provide a net lateral thrust force in a desired yaw direction.

6. A helicopter as claimed in claim 5, wherein the yaw/heading control mechanism is controlled by rudder pedals incorporating a gearing mechanism operative to vary the yaw demand dependant on the actual collective pitch setting of the auxiliary rotors.

7. A helicopter as claimed in claim 6, wherein the gearing is phased-in automatically by an electrical signal generated by the yaw/heading control mechanism in response to a reference signal from the auxiliary rotor differential pitch adjusting mechanism.

8. A helicopter as claimed in claim 5 and including a manual inhibition system arranged to selectively isolate the tail rotor differential pitch adjusting mechanism.

9. An improved helicopter having increased deceleration comprising a fuselage including a rearwardly extending tail cone, a main sustaining rotor located above the fuselage for rotation about a generally vertical axis, an auxiliary rotor assembly located adjacent the rear end of the tail cone and comprising two auxiliary rotors supported laterally one on each side of the tail cone, said auxiliary rotors drivingly coupled to the main sustaining rotor and a control system arranged to adjust the pitch settings of the auxiliary rotors so that when driving torque is applied to the main sustaining rotor the auxiliary rotors provide additive lateral thrust forces for yaw control, whereas during deceleration the auxiliary rotors provide lateral thrust forces in generally opposed directions for absorbing power from said main sustaining rotor during deceleration of the helicopter to increase deceleration.

10. A helicopter as claimed in claim 9, wherein the control system includes a differential pitch adjusting mechanism arranged to control the pitch setting of the two auxiliary rotors differentially to provide unequal lateral thrust forces in the generally opposed directions resulting in a variable net lateral thrust in one desired lateral direction.

* * * * *